(12) United States Patent
Mason

(10) Patent No.: US 11,780,678 B1
(45) Date of Patent: Oct. 10, 2023

(54) MODULAR CONVEYOR BELT WITH RETAINED ROLLERS

(71) Applicant: Mason Plastics Co., Winchester, TN (US)

(72) Inventor: William Mason, Winchester, TN (US)

(*) Notice: Subject to any disclaimer, the term of this patent is extended or adjusted under 35 U.S.C. 154(b) by 0 days.

(21) Appl. No.: 18/105,050

(22) Filed: Feb. 2, 2023

(51) Int. Cl.
*B65G 15/22* (2006.01)
*B65G 17/08* (2006.01)
*B65G 17/40* (2006.01)

(52) U.S. Cl.
CPC .......... *B65G 15/22* (2013.01); *B65G 2207/30* (2013.01)

(58) Field of Classification Search
None
See application file for complete search history.

(56) References Cited

U.S. PATENT DOCUMENTS

| | | | | |
|---|---|---|---|---|
| 6,059,097 A | * | 5/2000 | Clopton | B65G 17/086 198/852 |
| 6,148,990 A | * | 11/2000 | Lapeyre | B65G 17/40 198/779 |
| 6,364,095 B1 | * | 4/2002 | Layne | B65G 21/22 198/852 |
| 6,932,211 B2 | * | 8/2005 | Wieting | B65G 17/40 198/853 |
| 7,527,146 B2 | | 5/2009 | Stebnicki et al. | |
| 8,151,978 B2 | | 4/2012 | Wieting et al. | |

* cited by examiner

*Primary Examiner* — Kavel Singh
(74) *Attorney, Agent, or Firm* — Mark A. Pitchford; Eric B. Fugett; Pitchford Fugett, PLLC

(57) ABSTRACT

A modular conveyor belt including a plurality of rods, a plurality of rollers, and a plurality of links. Each link includes a main body, a plurality of link hinge members, and a plurality of roller hinge members. Each roller hinge member has an opening therethrough configured for receiving a corresponding rod and a recessed retainer configured for receiving and retaining a corresponding roller.

17 Claims, 5 Drawing Sheets

MODULAR CONVEYOR BELT WITH RETAINED ROLLERS

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The disclosure relates generally to modular conveyor belts. More particularly, this disclosure pertains to assemblies and methods for constructing conveyor belts with rollers.

Modular conveyor belts generally include toothed modules or links that are movably coupled to one another by rods. The belts are typically supported by a conveyor frame and driven by a gear motor. Each link has a support surface which supports the product being conveyed.

Some modular conveyor belts include rollers that are incorporated in between the links. The rollers allow the conveyor to continue to travel while the product is backed up or otherwise stationary, which in turn significantly reduces backline pressure. The rollers are typically mounted directly on the same rod which connects the links together. Due to the mounting position of the rod, the rollers typically extend both above and below the top and bottom surfaces of the link. During operation, the rollers may accordingly contact the conveyor frame or chain. This contact between the rollers and the frame or chain may lead to excessive wear on or damage to the rollers, the frame, and/or the chain. Furthermore, assembling the links and rollers together using a common rod is labor intensive and quite cumbersome. Additionally, repairing the belt is also difficult and time consuming due to the free-floating rollers.

BRIEF SUMMARY OF THE INVENTION

Aspects of the invention provide a modular conveyor belt. The modular conveyor belt includes rollers and links that are movably connected by a common rod. The links have roller hinge members with retainers that guide and retain the rollers therein. The rollers have annular protrusions at both lateral ends for engaging with the retainers of juxtaposed roller hinge members. Upon positioning the rollers within the roller hinge members, the corresponding rod may be inserted through the rollers and roller hinge members to simultaneously secure the rollers and links.

In one aspect, a modular conveyor belt includes a plurality of rods and a plurality of rollers. Each roller has an opening therethrough for receiving a corresponding rod of the plurality of rods. The modular conveyor belt also includes a plurality of links connected to one another by the plurality of rods. Each link comprises a main body extending along a longitudinal axis and a plurality of link hinge members extending laterally from the main body and configured for movably connecting adjacent links of the plurality of links. Each link hinge member has an opening therethrough configured for receiving the corresponding rod of the plurality of rods. Each link also includes a plurality of roller hinge members extending laterally from the main body and configured for dually mounting the plurality of rollers and movably connecting the adjacent links of the plurality of links. Each roller hinge member has an opening therethrough configured for receiving the corresponding rod of the plurality of rods and a recessed retainer configured for receiving and retaining a corresponding roller of the plurality of rollers.

In another aspect, a link of a modular conveyor belt is provided. The link comprises a main body extending along a longitudinal axis and a plurality of link hinge members extending laterally from the main body. Each link hinge member has opening therethrough configured for receiving a corresponding rod of a plurality of rods for movably connecting adjacent links to one another. The link further comprises a plurality of roller hinge members extending laterally from the main body. The plurality of roller hinge members is configured for dually mounting a corresponding roller of a plurality of rollers and movably connecting the adjacent links. Each roller hinge member has an opening therethrough configured for receiving the corresponding rod of the plurality of rods and a recessed retainer configured for receiving and retaining the corresponding roller of the plurality of rollers.

BRIEF DESCRIPTION OF THE SEVERAL VIEWS OF THE DRAWINGS

Reference will now be made in detail to optional embodiments of the invention, examples of which are illustrated in accompanying drawings. Whenever possible, the same reference numbers are used in the drawings and in the description referring to the same or like parts.

DETAILED DESCRIPTION OF THE INVENTION

Figure 1:
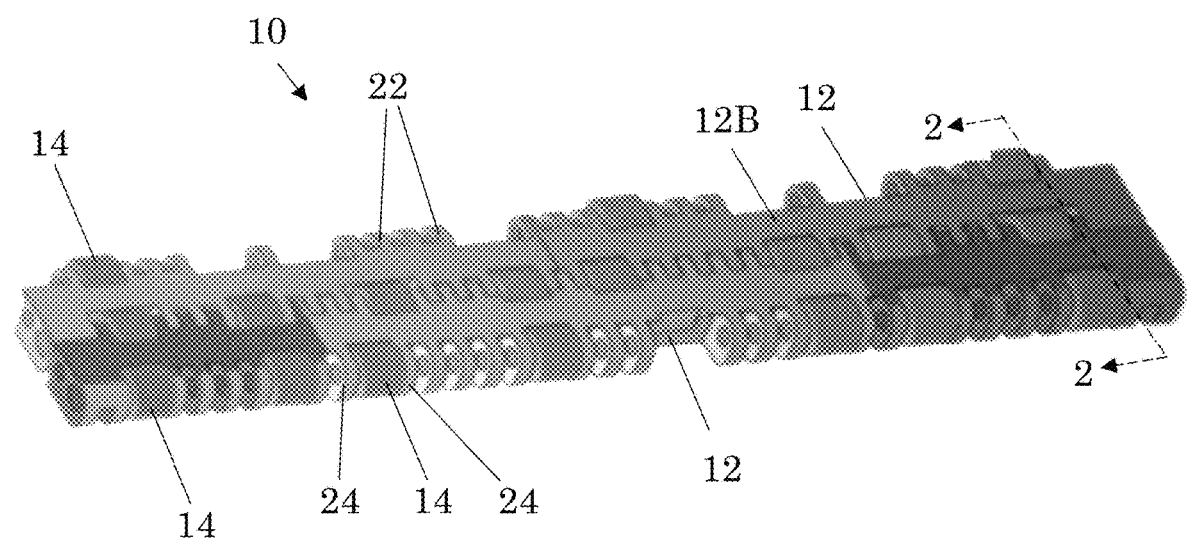
FIG. 1 is a perspective view of a modular conveyor belt that includes links and rollers coupled to one another by rods.
Figure 2:
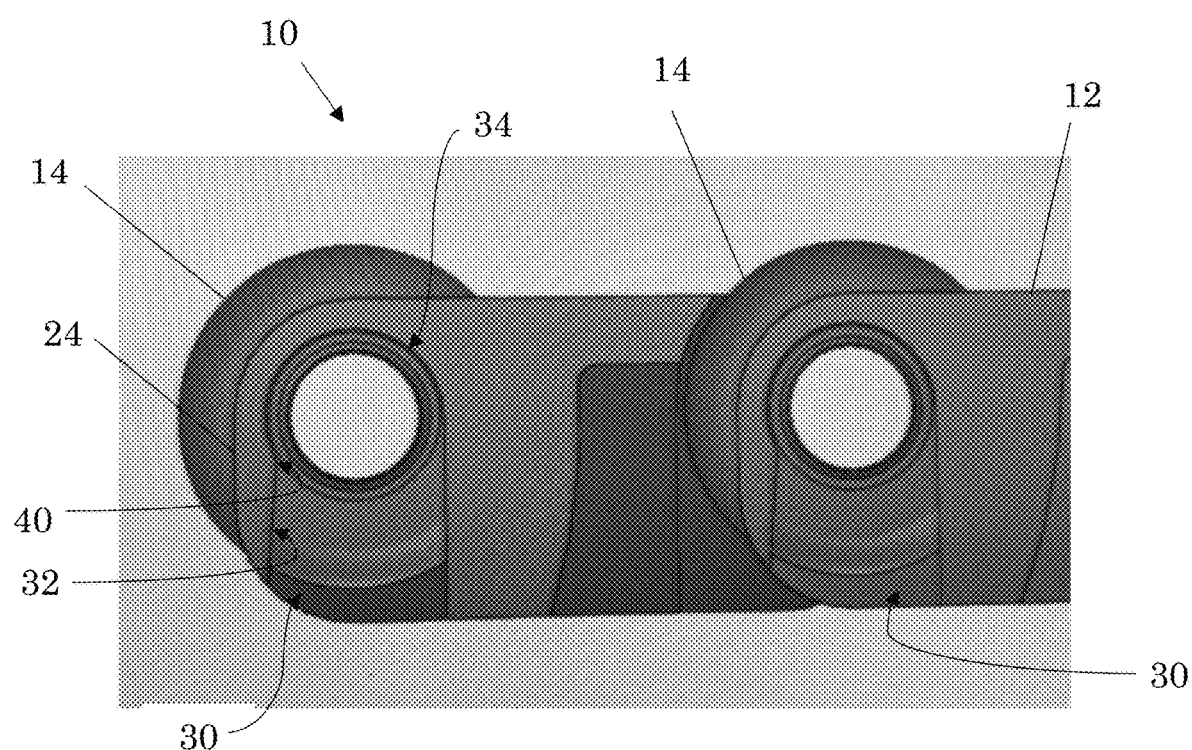
FIG. 2 is a cross sectional view of the modular conveyor belt, taken across line 2-2 of FIG. 1.

While the making and using of various embodiments are discussed in detail below, it should be appreciated that many applicable inventive concepts can be embodied in a wide variety of specific contexts. The specific embodiments discussed herein are merely illustrative of specific ways to make and use the invention and do not delimit the scope thereof.

To facilitate the understanding of the embodiments described herein, a number of terms are defined below. The terms defined herein have meanings as commonly understood by a person of ordinary skill in the areas relevant to the disclosure. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims.

As described herein, an upright position is considered to be the position of apparatus components while in proper operation or in a natural resting position as described herein. Vertical, horizontal, above, below, side, top, bottom and other orientation terms are described with respect to this upright position during operation unless otherwise specified. The term "when" is used to specify orientation for relative positions of components, not as a temporal limitation of the claims or apparatus described and claimed herein unless otherwise specified. The terms "above", "below", "over", and "under" mean "having an elevation or vertical height greater or lesser than" and are not intended to imply that one object or component is directly over or under another object or component.

The phrase "in one embodiment," as used herein does not necessarily refer to the same embodiment, although it may. Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without operator input or prompting, whether these features, elements and/or states are included or are to be performed in any particular embodiment.

Referring to FIGS. 1-5, a modular conveyor belt 10 is shown. The modular conveyor belt 10 includes links 12 and rollers 14 interconnected to one another by elongated rods 16, which thereby form a continuous belt. The modular conveyor belt 10 travels in a forward direction of conveyor travel. The modular conveyor belt 10 may include any desired numbers of links 12, rollers 14, and rods 16 for forming a belt 10 of any desired length. The modular conveyor belt 10 may be used in any desired industry.

Figure 3:
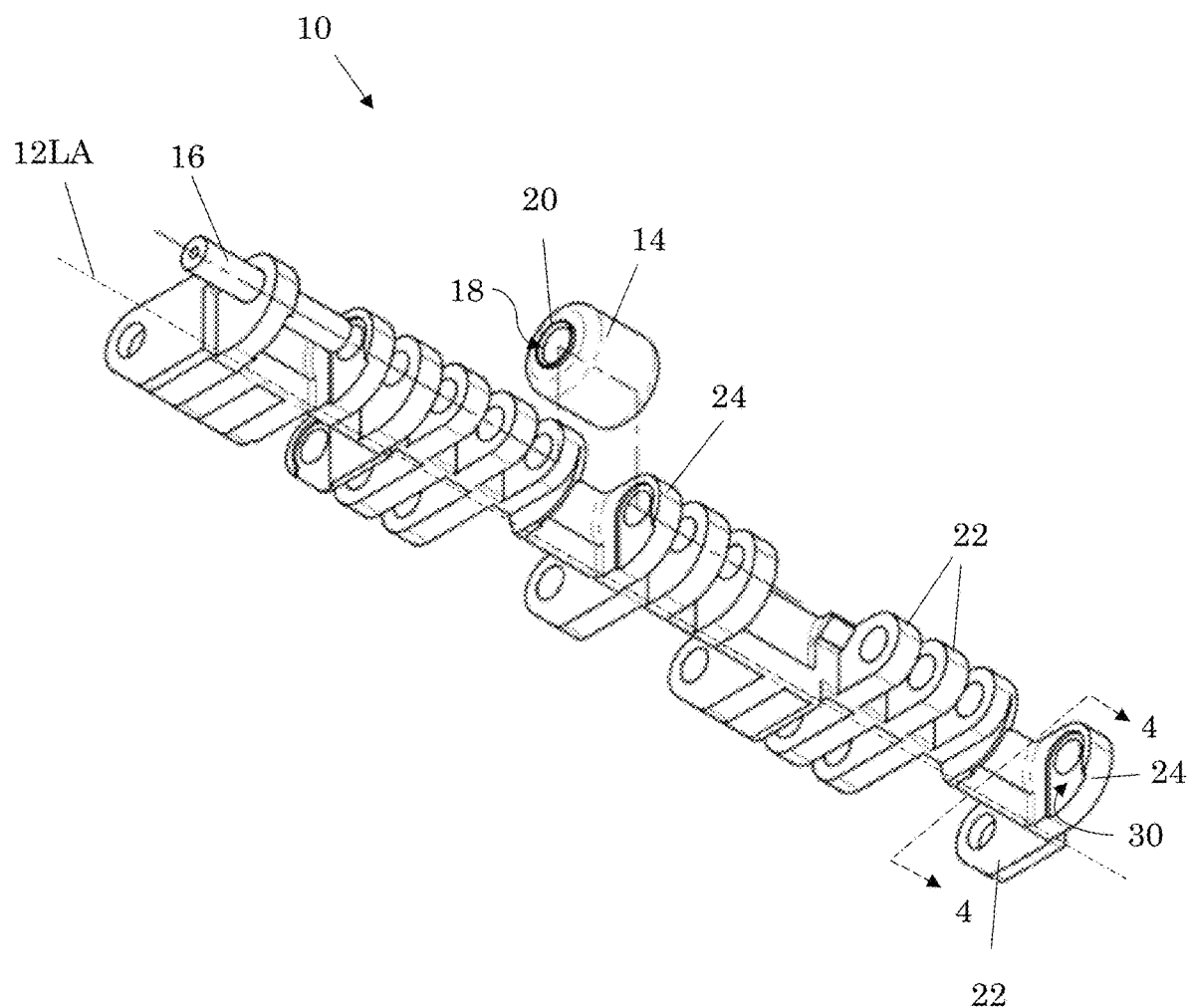
FIG. 3 is an exploded view of a link and a roller of the conveyor belt.

The rods 16 movably couple the links 12 and rollers 14 to one another (FIG. 3). The rods 16 may or may not extend the full width of the belt 10. The rods 16 may or may not have a circular cross-section. One or both ends of the rod 16 may be chamfered or filleted for easily inserting the rod 16 through the links 12 and rollers 14. Each rod 16 may comprise any desired material, such as plastic or metal. For example, each rod 16 may be injection-molded out of a thermoplastic polymer, such as polypropylene, polyethylene, or acetal.

Figure 5:
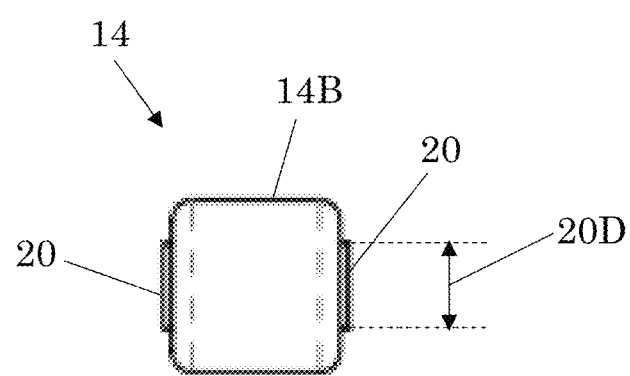
FIG. 5 is a front view of the roller.

The rollers 14 are pivotally mounted on the links 12 by the rods 16. Each roller 14 has an annular body 14B with lateral ends and an opening 18 therethrough for receiving a corresponding rod 16 (FIGS. 3 and 5). The opening 18 extends through the entire length of the annular body 14B. The annular body 14B also includes first and second, or left and right, annular protrusions 20 located at each lateral end. The annular protrusions 20 circumferentially extend around the opening 18 on each lateral end. The annular protrusions 20 are coaxial with and respectively extend outwardly from the opening 18 at each lateral end. Each annular protrusion 20 has an inside diameter at its inner periphery and an outer diameter 20D at its outer periphery (FIG. 5). The inside diameter of each annular protrusion 20 may match or be slightly greater than the diameter of the opening 18. The annular protrusions 20 may or may not be substantially identical to one another. The rollers 14 may comprise any desired material, such as plastic. For example, each roller 14 may be injection-molded out of a thermoplastic polymer, such as polypropylene, polyethylene, or acetal.

Due to the off-center mounting position on each link 12, each roller 14 extends above its respective link 12, but the roller 14 does not extend below its respective link 12. Since each roller 14 sits above the centerline line of each link 12, the roller 14 cannot extend below or touch the bottom surface of the belt 10. Thereby, the rollers 14 do not interfere with the chain or the conveyor frame.

The links 12 are movably connected to one another by the rods 16. Multiple links 12 may be placed end-to-end to form the overall width of the belt 10. Each link 12 includes a main body 12B that defines a longitudinal axis 12LA, multiple link hinge members 22, and multiple roller hinge members 24. The link and roller hinge members 22, 24 extend outwardly and substantially perpendicularly from the main body 12B. The link and roller hinge members 22, 24 are located on both the leading and trailing sides of the main body 12B. For example, both of the leading side and the trailing side of the main body 12B may have at least two roller hinge members 24 and accordingly at least one roller 14 located between the at least two roller hinge members 24. It should be appreciated that the main body 12B may be distinct from the hinge members 22, 24. Alternatively, portions of the hinge members 22, 24 themselves may define the main body 12B. Each link 12 may comprise any desired material, such as plastic. For example, each link 12 may be injection-molded out of a thermoplastic polymer, such as polypropylene, polyethylene, or acetal.

Figure 4:
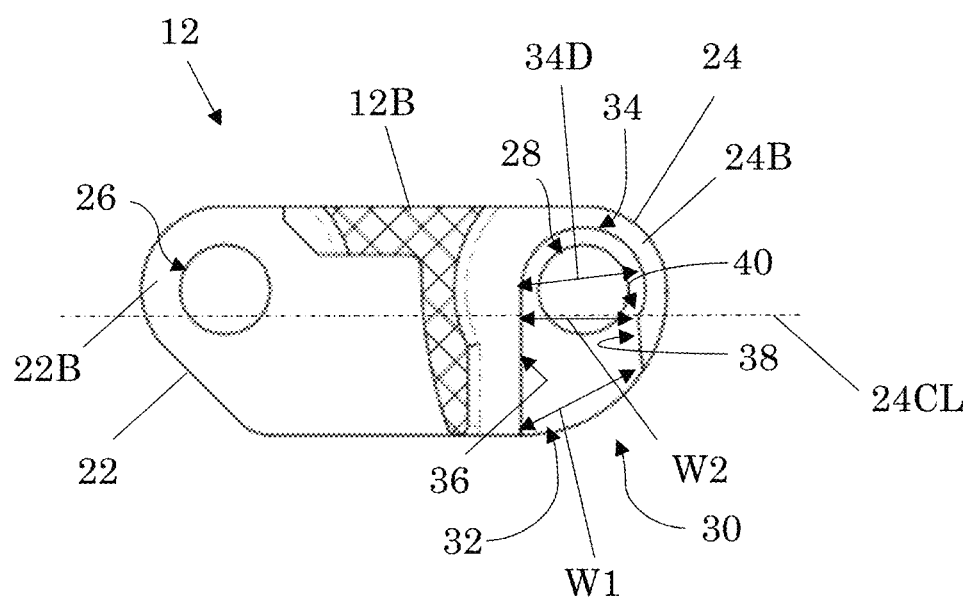
FIG. 4 is a cross sectional view of the link, taken across line 4-4 of FIG. 3.

The link hinge members 22 are configured for movably connecting adjacent links 12. Each link hinge member 22 has a body 22B with an opening 26 therethrough that is configured for receiving the corresponding rod 16 (FIG. 4).

The roller hinge members 24 are configured for dually mounting the plurality of rollers 14 and movably connecting the adjacent links 12. Each roller hinge member 24 has a body 24B with an opening 28 therethrough that is configured for receiving the corresponding rod 16 (FIG. 4). The opening 26 of the link hinge member 22 and the opening of the 28 of the roller hinge member 24 are in line with one another. The center of the opening 28 in the body 24B is located above the centerline 24CL of the body 24B (FIG. 4). Accordingly, each roller 14 has an off-center mount, and axis of rotation, that is located above the centerline 24CL of each roller hinge member 24. Thereby, each roller 14 extends above the product-facing or top surface of the link 12, but the roller 14 does not extend below the bottom surface of the link 12. The elevated position of the opening 28 in the body 24B of the roller hinge member 24, above the centerline 24CL, accordingly mounts the roller 14 at an elevated mounting location, which thereby protects the roller 14, as well as the drive components and frame, from excess wear and/or damage.

The body 24B of each roller hinge member 24 further includes a recessed retainer 30 that is configured for receiving and retaining a corresponding roller 14. The annular protrusions 20 of each roller 14 respectively fit within a juxtaposed pair of recessed retainers 30 of a corresponding pair of roller hinge members 24. The general shape and size of the roller hinge members 24 may be substantially identical to the link hinge members 22, but for the retainers 30 of the roller hinge members 24. Alternatively, some or all of the roller hinge members 24 may have a differing width and/or include an additional lip member which provides additional surface area for the retainer 30.

Each retainer 30 is recessed into the front and edge surfaces of the body 24B of each roller hinge member 24. In other words, each retainer 30 extends into the roller surface, i.e., roller-facing surface, and the bottom surface of the body 24B of each roller hinge member 24. The bottom surface of the body 24B of each roller hinge member 24 is adjacent to the roller surface, and the bottom surface is configured for facing a drive roller driving the modular conveyor belt 10 when the link 12 is properly installed.

Each retainer 30 has a receiving section 32 and a semi-annular holding section 34 located above the receiving section 32. The receiving and holding sections 32, 34 may have one continuous guide wall or may be segmented into multiple guide walls. Therein, the receiving and holding sections 32, 34 may be integral with one another as one seamless section or may be separate sections connected to each other.

The receiving section 32 is configured for receiving and guiding the roller 14 toward the holding section 34. The receiving section 32 is tapered for guiding the roller 14 toward the holding section 34. The receiving section 32 is tapered in that the receiving section 32 tapers, i.e., its width narrows, as it approaches the holding section 34, as indicated by the first, proximal width W1 and the second, distal width W2 in FIG. 4. The receiving section 32 of each retainer 30 has open ends, a first guide wall 36 oriented at a first angle, and a second guide wall 38 opposite the first guide wall 36 and oriented at a second angle which is different than the first angle. The first guide wall and the second guide wall 36, 38 may be unparallel with one another. As viewed on the left in FIG. 4, the first guide wall 36 may be substantially vertical, plus or minus 10 degrees from the guide wall at the bottom of the holding section 34. As viewed on the right, the second guide wall 38 may be angled relative to the first guide wall 36 such that the receiving section 32 is wider at its open end and narrower near the point at which it connects to the holding section 34. The first and second guide walls 36, 38 adjoin the annular wall of the holding section 34. The first and second guide walls 36, 38 may or may not have a uniform depth. In other words, the roller-facing surface of the receiving section 32 may be flat or angled.

The open ends of the receiving section 32, located in between the guide walls 36, 38, allow the annular protrusion 20 of the roller 14 pass to through the receiving section 32. The first open end is located adjacent to and opens toward the bottom surface of the body 24B of each roller hinge member 24. The second open end is located adjacent to and opens toward the holding section 34. Since the receiving section 32 is tapered, the width W1 of the first open end is greater than the width W2 of the second open end. In relation to the roller 14, the width W1 of the first open end is greater than the outer diameter 20D of the annular protrusion 20 of the roller 14, and the width W2 of the second open end is less than the outer diameter 20D of the annular protrusion 20 of the roller 14.

The holding section 34 is configured for holding the roller 14, and more particularly, the annular protrusion 20 of the roller 14. The holding section 34 of each retainer 30 is located above the receiving section 32. The holding section 34 has a curved wall with an open end that opens into the receiving section 32. The holding section 34 is coaxial with the opening 28 of the body 24B of each roller hinge member 24. The holding section 34 may have a size and a shape that corresponds to the size and shape of the protrusion 20 of the roller 14.

The holding section 34 of each retainer 30 may be semi-annular. For example, the curved wall of the holding section 34 can have an arc length of greater than 180 degrees or more than 50% of a circle. The angle of the arc of the holding section 34 may be greater than 180 degrees. The angle of the arc of the holding section 34 may be approximately 200 degrees, plus or minus 20 degrees. Thereby, the curved wall of the holding section 34 may extend around a majority of the circumference of the annular protrusion 20 of the roller, such as 51 to 70 percent of the circumference of the annular protrusion 20 of the roller 14. In relation to the roller 14, the diameter 34D of the holding section 34 is greater than the outer diameter 20D of the annular protrusion 20D of the roller 14.

The holding section 34 has a ledge 40 for the roller 14 to rest upon (FIG. 4). In other words, the ledge 40 is created by the intersection of the holding section 34 and the receiving section 32; and more specifically, the intersection of the arc of the holding section 34 and the second guide wall 38 of the receiving section 32. The ledge 40 can be substantially inline with the centerline 24CL of the roller hinge member 24. The holding section 34 may only have one ledge 40 which contacts and supports the roller 14. Therein, the roller 14 may only be supported and retained within the holding section 34 at a single contact point, e.g., the ledge 40.

The holding section 34 may be configured to only hold the roller 14. In other words, each roller 14 may not be snapped or press-fit into the corresponding retainers 30. The rollers 14 may only be held in place by the retainers 30, such as gently resting on the ledge 40, without excessive pressure and/or friction. Therein, a retention or holding force of the holding section 34, applied by way of the ledge 40 and the curved guide wall of the holding section 34, may be less than the retention or holding force of a conventional snap-fit or press-fit design.

In assembly, each roller 14 may be easily slid into the retainers 30 of juxtaposed roller hinge members 24. The retainers 30 offer little resistance during insertion of the roller 14 whilst still desirably holding the roller 14, which significantly reduces the difficulty and assembly time required to insert the rollers 14, as compared to known press-fit link designs. Accordingly, each roller 14 will be temporarily held in place before the insertion of the corresponding rod 16. The links 12 and rollers 14 may be desirably aligned, and the rod 16 may then be inserted through the links 12 and the rollers 14 to permanently secure the links 12 and rollers 14 in place.

It is contemplated within the scope of the claims that not all rollers in a conveyor belt assembly are the same size or shape. Similarly, it is contemplated within the scope of the claims that although a plurality of rods, rollers, and roller hinge members may be substantially identical, a conveyor belt assembly may contain links, rods, rollers, and roller hinge members that differ in shape and size from those in the plurality without departing from the scope of the claims.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It will be understood that the particular embodiments described herein are shown by way of illustration and not as limitations of the invention. The principal features of this invention may be employed in various embodiments without departing from the scope of the invention. Those of ordinary skill in the art will recognize numerous equivalents to the specific procedures described herein. Such equivalents are considered to be within the scope of this invention and are covered by the claims.

All of the compositions and/or methods disclosed and claimed herein may be made and/or executed without undue experimentation in light of the present disclosure. While the compositions and methods of this invention have been described in terms of the embodiments included herein, it will be apparent to those of ordinary skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

Thus, although there have been described particular embodiments of the MODULAR CONVEYOR BELT WITH RETAINED ROLLERS it is not intended that such references be construed as limitations upon the scope thereof except as set forth in the following claims.

What is claimed is:

1. A modular conveyor belt, comprising:
   a plurality of rods;
   a plurality of rollers, each roller having an opening therethrough for receiving a corresponding rod of the plurality of rods; and
   a plurality of links configured for being connected to one another by the plurality of rods, each link comprising:
      a main body extending along a longitudinal axis;
      a plurality of link hinge members extending laterally from the main body and configured for movably connecting adjacent links of the plurality of links, each link hinge member having an opening therethrough configured for receiving the corresponding rod of the plurality of rods; and
      a plurality of roller hinge members extending laterally from the main body and configured for dually mounting a corresponding roller of the plurality of rollers and movably connecting the adjacent links of the plurality of links, each roller hinge member having an opening therethrough configured for receiving the corresponding rod of the plurality of rods and a recessed retainer configured for receiving and retaining the corresponding roller of the plurality of rollers, wherein:
         each roller of the plurality of rollers comprises an annular protrusion at each lateral end thereof, each annular protrusion of each roller of the plurality of rollers having an outer diameter;
         the recessed retainer of each roller hinge member of the plurality of roller hinge members comprises a receiving section and a semi-annular holding section adjacent to the receiving section, the semi-annular holding section having a diameter;
         the receiving section comprises a first guide wall and a second guide wall opposite the first guide wall;
         the receiving section has open ends between the first guide wall and the second guide wall such that the receiving section opens toward a bottom surface of each roller hinge member of the plurality of roller hinge members at a first open end and opens toward the semi-annular holding section at a second open end;
         the receiving section is tapered such that a first width of the first open end is greater than a second width of the second open end;
         the first width of the first open end of the receiving section is greater than the outer diameter of each annular protrusion of each roller of the plurality of rollers;
         the second width of the second open end of the receiving section is less than the outer diameter of each annular protrusion of each roller of the plurality of rollers; and
         the diameter of the semi-annular holding section is greater than the outer diameter of each annular protrusion of each roller of the plurality of rollers.

2. The modular conveyor belt of claim 1, wherein:
   the corresponding roller of the plurality of rollers is configured for being slid in between and held by a juxtaposed pair of recessed retainers of a corresponding pair roller hinge members of the plurality of roller hinge members.

3. The modular conveyor belt of claim 1, wherein:
   each roller hinge member of the plurality of roller hinge members further comprises a roller surface facing the corresponding roller of the plurality of rollers and a bottom surface adjacent to the roller surface and configured for facing a drive roller driving the modular conveyor belt when the link is properly installed; and
   the recessed retainer extends into the roller surface and the bottom surface of each roller hinge member of the plurality of roller hinge members.

4. The modular conveyor belt of claim 1, wherein:
   the receiving section is configured for receiving and guiding the corresponding roller of the plurality of rollers toward the semi-annular holding section; and
   the semi-annular holding section is configured for retaining the corresponding roller of the plurality of rollers.

5. The modular conveyor belt of claim 1, wherein:
   the semi-annular holding section of the recessed retainer is coaxial with the opening of each roller hinge member of the plurality of roller hinge members.

6. The modular conveyor belt of claim 1, wherein:
   the receiving section tapers toward the semi-annular holding section for guiding the corresponding roller of the plurality of rollers toward the semi-annular holding section.

7. The modular conveyor belt of claim 1, wherein:
   an intersection between the receiving section and the semi-annular holding section forms a ledge configured for supporting and retaining the corresponding roller of the plurality of rollers within the semi-annular holding section.

8. The modular conveyor belt of claim 1, wherein:
   a center of the opening through each roller hinge member of the plurality of roller hinge members is offset from a centerline of each roller hinge member of the plurality of roller hinge members such that each roller of the plurality of rollers is configured for extending above each roller hinge member of the plurality of roller hinge members.

9. The modular conveyor belt of claim 1, wherein:
the main body of each link of the plurality of links has a leading side and a trailing side as viewed in a direction of conveyor travel;
the leading side of the main body of each link of the plurality of links has at least two roller hinge members of the plurality of roller hinge members extending therefrom;
the trailing side of the main body of each link of the plurality links has at least two roller hinge members of the plurality of roller hinge members extending therefrom;
at least one roller of the plurality of rollers is located on the leading side of the main body of each link of the plurality of links; and
at least one roller of the plurality of rollers is located on the trailing side of the main body of each link of the plurality of links.

10. A link of a modular conveyor belt, comprising:
a main body extending along a longitudinal axis;
a plurality of link hinge members extending laterally from the main body, each link hinge member having an opening therethrough configured for receiving a corresponding rod of a plurality of rods for movably connecting adjacent links to one another; and
a plurality of roller hinge members extending laterally from the main body and configured for dually mounting a corresponding roller of a plurality of rollers and movably connecting the adjacent links, each roller hinge member having an opening therethrough configured for receiving the corresponding rod of the plurality of rods and a recessed retainer configured for receiving and retaining the corresponding roller of the plurality of rollers, wherein:
the recessed retainer of each roller hinge member of the plurality of roller hinge members comprises a receiving section and a semi-annular holding section adjacent to the receiving section, the semi-annular holding section having a diameter;
the receiving section comprises a first guide wall and a second guide wall opposite the first guide wall;
the receiving section has open ends in between the first guide wall and the second guide wall such that the receiving section opens toward a bottom surface of each roller hinge member of the plurality of roller hinge members at a first open end and opens toward the semi-annular holding section at a second open end;
the receiving section is tapered such that a first width of the first open end is greater than a second width of the second open end;
the first width of the first open end of the receiving section is greater than the outer diameter of each annular protrusion of each roller of the plurality of rollers;
the second width of the second open end of the receiving section is less than the outer diameter of each annular protrusion of each roller of the plurality of rollers; and
the diameter of the semi-annular holding section is configured for being greater than the outer diameter of the annular protrusion of each roller of the plurality of rollers.

11. The link of claim 10, wherein:
the corresponding roller of the plurality of rollers is configured for being slid in between and held by a juxtaposed pair of recessed retainers of a corresponding pair of roller hinge members of the plurality of roller hinge members.

12. The link of claim 10, wherein:
each roller hinge member of the plurality of roller hinge members further comprises a roller surface configured for facing the corresponding roller of the plurality of rollers and a bottom surface adjacent to the roller surface and configured for facing a drive roller driving the modular conveyor belt when the link is properly installed; and
the recessed retainer extends into the roller surface and the bottom surface of each roller hinge member of the plurality of roller hinge members.

13. The link of claim 10, wherein:
the receiving section is configured for receiving and guiding the corresponding roller of the plurality of rollers toward the semi-annular holding section; and
the semi-annular holding section is configured for retaining the corresponding roller of the plurality of rollers.

14. The link of claim 10, wherein
the semi-annular holding section of the recessed retainer is coaxial with the opening of each roller hinge member of the plurality of roller hinge members.

15. The link of claim 10, wherein:
the receiving section tapers toward the semi-annular holding section for guiding the corresponding roller of the plurality of rollers toward the semi-annular holding section.

16. The link of claim 10, wherein:
an intersection between the receiving section and the semi-annular holding section forms a ledge configured for supporting and retaining the corresponding roller of the plurality of rollers within the semi-annular holding section.

17. The link of claim 10, wherein:
a center of the opening through each roller hinge member of the plurality of roller hinge members is offset from a centerline of each roller hinge member of the plurality of roller hinge members such that each roller of the plurality of rollers is configured for extending above each roller hinge member of the plurality of roller hinge members.

* * * * *